United States Patent
Bergonnier et al.

(10) Patent No.: US 8,998,141 B2
(45) Date of Patent: Apr. 7, 2015

(54) AIRCRAFT HATCH EMERGENCY OPENING ACTUATOR INCLUDING OPENING DELAY MEANS

(71) Applicant: Ratier Figeac, Figeac Cedex (FR)

(72) Inventors: Hélène Bergonnier, Figeac (FR); Eric Delbos, LaCapelle-Marival (FR)

(73) Assignee: Ratier Figeac, Figeac Cedex (FR)

( * ) Notice: Subject to any disclaimer, the term of this patent is extended or adjusted under 35 U.S.C. 154(b) by 146 days.

(21) Appl. No.: 13/656,229

(22) Filed: Oct. 19, 2012

(65) Prior Publication Data

US 2013/0097930 A1    Apr. 25, 2013

(30) Foreign Application Priority Data

Oct. 21, 2011 (FR) ..................................... 11 59584

(51) Int. Cl.
| | |
|---|---|
| *B64C 1/14* | (2006.01) |
| *E05F 15/02* | (2006.01) |
| *F15B 15/19* | (2006.01) |
| *F15B 13/02* | (2006.01) |

(52) U.S. Cl.
CPC .............. *B64C 1/1423* (2013.01); *E05F 15/02* (2013.01); *F15B 15/19* (2013.01); *F15B 13/027* (2013.01)

(58) Field of Classification Search
USPC ........ 244/129.4, 129.5, 99.2, 99.3, 905, 99.5, 244/99.6; 49/141, 29, 30
See application file for complete search history.

(56) References Cited

U.S. PATENT DOCUMENTS

| | | | | |
|---|---|---|---|---|
| 3,031,845 | A * | 5/1962 | Ludwig ........................... | 60/632 |
| 6,752,356 | B2 * | 6/2004 | Baderspach et al. ........ | 244/129.5 |
| 6,786,454 | B2 * | 9/2004 | Baderspach et al. ........ | 244/129.5 |
| 7,114,431 | B1 * | 10/2006 | Holder ........................... | 91/436 |
| 7,401,751 | B2 * | 7/2008 | Holder ........................ | 244/129.5 |
| 7,690,153 | B2 * | 4/2010 | Pelz ................................ | 49/141 |
| 2003/0089827 | A1 * | 5/2003 | Baderspach et al. ........ | 244/137.2 |
| 2004/0113017 | A1 * | 6/2004 | Baderspach et al. ........ | 244/129.5 |
| 2006/0010769 | A1 * | 1/2006 | Pelz ................................ | 49/141 |
| 2006/0230919 | A1 * | 10/2006 | Holder ........................... | 91/436 |
| 2006/0266887 | A1 * | 11/2006 | Holder ........................ | 244/129.5 |
| 2011/0225963 | A1 * | 9/2011 | Delbos ........................... | 60/459 |

FOREIGN PATENT DOCUMENTS

| | | | |
|---|---|---|---|
| EP | 1 418 121 A1 | 5/2004 | |
| WO | WO 2009/115879 A1 | 9/2009 | |

OTHER PUBLICATIONS

French Preliminary Search Report dated Jun. 20, 2012.

* cited by examiner

*Primary Examiner* — Philip J Bonzell
(74) *Attorney, Agent, or Firm* — Birch, Stewart, Kolasch & Birch, LLP (57) ABSTRACT

An aircraft hatch emergency opening actuator, includes, a cylinder connected to the hatch at one end to a reference frame at the other end to which the hatch is connected, fluid means feeding the cylinder for emergency opening of the hatch, means for injection of the fluid means at a point of a fluid circuit feeding the cylinder for emergency opening of the hatch, said injection means configured to adopt:
  a rest position, in which the fluid means are isolated from the cylinder, and
  an active position, in which the fluid means are injected at the point of the fluid circuit, means for delaying the injection of the fluid means into the cylinder including a mobile element in the fluid circuit, delaying opening of the circuit when the injection means are in the active position, the injection delay being determined by a time of movement of the mobile element.

20 Claims, 4 Drawing Sheets

AIRCRAFT HATCH EMERGENCY OPENING ACTUATOR INCLUDING OPENING DELAY MEANS

The present invention relates to an aircraft hatch emergency opening actuator including:

a cylinder arranged to be connected to said hatch at one of its ends and at its other end to a reference frame of the aircraft to which said hatch is connected, fluid means for feeding said cylinder for emergency opening of the hatch, means for injection of said fluid means at a first point of a first fluid circuit feeding said cylinder for emergency opening of the hatch, said injection means being able to adopt two positions:

- a first position, called the rest position, in which said fluid means are isolated from said cylinder, and
- a second position, called the active position, in which said fluid means are injected at said first point of said first fluid circuit.

This type of actuator is known, for example an actuator fed by a reservoir of pressurized gas that is released by the action of a percussion member actuated manually by a member of the crew or alternatively fed with a gas obtained by pyrotechnic means.

Such an actuator can advantageously include a device for delaying opening of the door that enables a latency time to be inserted between the moment at which the operator manoeuvres the emergency opening system and the moment at which the door opens. This opening delay device essentially leaves time for the members of the crew to let go of the handle of the door after an emergency door opening procedure.

A known door opening delay device introduces a chicane type dedicated singular head loss, directly at the reservoir outlet in the case of a pressurized gas fed from a reservoir of pressurized gas, in order to limit acceleration of the opening of the door after percussion and/or increases the dead volume associated with the cylinder in order to defer the commencement of movement of the cylinder by an effect of delaying accession to the pressure threshold necessary for this movement to commence.

The delay device that introduces a singular head loss has the drawback of being unable to use all of the energy really available in the reservoir of pressurized gas because of the pressure difference needed to obtain reasonable door acceleration on opening is very much less than the pressure difference needed to empty this reservoir rapidly during the allocated time, for example 8 seconds to open the door. Because of this, a large reserve of energy remains unused at the end of opening the door.

The delay device that increases the dead volume associated with the cylinder has the drawback of overspecification of the cylinder that is of no utility given its basic function.

An objective of the present invention is to propose an alternative delay system that notably alleviates the above drawbacks in the case of feeding the cylinder by means of a reservoir of pressurized gas, and provides other advantages of a more general nature, in particular optimization of the energy used. To be more precise, the invention consists in an actuator as defined above characterized in that it further includes means for delaying the injection of said fluid means into said cylinder, which delay means include a mobile element in said first fluid circuit, disposed between said first point and said cylinder, delaying opening of said first circuit when said injection means are in the active position, the injection delay being determined by a time of movement of said mobile element.

The movement of a mobile element, which is advantageously driven by the fluid means released by placing the injection means in the active position, enables the use to be dispensed with of a dedicated singular head loss placed in series in the circuit feeding the cylinder, and thus enables a feeding circuit for the cylinder to be produced that uses all of the fluid energy available in the time allocated for emergency opening of the hatch, whilst retaining the presence of an opening delay system. As soon as the circuit is opened by the mobile element after the delay means have operated, a maximum pressure of the fluid means may advantageously be fed to the cylinder. Hence optimization of the energy means assigned to emergency opening of the hatch, including in the case of feeding with a pressurized gas using a pyrotechnic method. The delay on opening the hatch, generated by a delay in the injection of the fluid into the cylinder thanks to a delay in opening the feed circuit thereof when the pressurized gas is injected into the feed circuit, is advantageously adjustable by operating in particular on the length of the movement of the mobile element up to opening of the circuit and/or the speed of movement of the mobile element and/or the delay on commencing movement of the mobile element. The mobile element serves as an element for opening and closing the circuit feeding the cylinder when the injection means have been activated.

According to an advantageous feature, said injection means include:

- a reservoir of pressurized gas, said gas reservoir including a membrane adapted to be perforated to place said injection means in the active position and thus to actuate said cylinder for emergency opening of the hatch by release of the gas from said reservoir,
- a mobile perforator arranged to perforate same membrane of said reservoir, thus releasing the pressurized gas to said cylinder via the first fluid circuit.

This feature, known in itself, is particularly suitable for the actuator of the invention, which enables precise adjustment of the characteristics of the reservoir as a function of requirements. This has the effect of reducing the quantity of energy to be stored in the reservoir, whence an improvement in particular in terms of weight, cost and reliability.

According to an advantageous feature, said mobile element is constituted of a first slide valve actuated by said fluid means, said first slide valve being mobile in a body in which said first circuit is partly formed, at least between the following two positions, said injection means being in the active position:

a first position, called the rest position, in which said first circuit is closed, and a second position, called the active position, in which said first circuit is open.

The first slide valve serves as advantageous means for blocking the circuit for feeding the cylinder with fluid means.

According to an advantageous feature, said means for delaying injection further include a calibrated fluid orifice formed through a wall of said first slide valve, the two ends whereof connect two opposite faces of said first slide valve with different areas so as to enable said fluid means to create a differential pressure force on either side of wall, which leads to said first slide valve moving from its rest position to its active position.

Following activation of the injection means, the fluid means are injected under pressure onto the smallest face of a wall of the first slide valve and pass through the calibrated orifice, the pressure on the other side of the wall being lower, for example atmospheric pressure, because equal to the pressure of the first circuit before activation of the injection means. When the fluid means have passed through the calibrated orifice to reach and bear on the opposite face, the difference in area leads to virtually immediate movement of the slide valve; the first slide valve then by virtue of the differential thrust force of the fluid that must pass through the calibrated orifice continues its movement as far as the active position of the first slide valve and thus until the circuit feeding the cylinder is opened. Calibration of the flow section and the length of the restriction orifice thus enables determination of the delay on commencement of movement of the slide valve and the time of movement of the first slide valve between its rest and active positions, according to requirements, for a given friction force of the slide valve in its guide housing. Other parameters may operate on this delay, such as the time for the fluid means to travel between the outlet of the orifice and covering all of the area of the largest face of the wall or at least an area thereof larger than that of the smallest face.

According to an advantageous feature, the flow section of said calibrated fluid through-orifice and/or its length are defined so as to form a fluid restriction determining at least in part a delay on the commencement of movement of said first slide valve from its rest position, as well a movement time of said first slide valve from its rest position to its active position, which delays the opening of the circuit feeding the cylinder.

This feature enables action on the delay in opening the hatch according to requirements, by acting on the delay on commencement of movement of the slide valve blocking the circuit feeding the cylinder, and on the time of movement of said slide valve, at the level of the parameters of the restriction orifice.

According to an advantageous feature, the actuator of the invention further includes means for exhausting said fluid means from said cylinder via a second fluid circuit that does not feed said cylinder and the inlet of which is common to said first point of said first circuit when said injection means are in the rest position and in the event of accidental rupture of said membrane occurring other than on movement of said mobile perforator.

This feature is a safety feature for the actuator of the invention in combination with the opening delay system: in the situation indicated, the fluid means are diverted from the cylinder and thus prevent unintended opening of the hatch.

According to an advantageous feature, the actuator of the invention includes a second slide valve actuated by said fluid means, said second slide valve being mobile at least between the following two positions:

a first position, called the rest position, in which said second circuit is open when said injection means are in the rest position, and a second position, called the active position, in which said second circuit is closed when said injection means are in the active position.

The second slide valve has the function of blocking the exhaust circuit that functions when the injection means go to the active position, for example through the action of an operator on a manoeuvring handle activating a perforator in the case of an actuator employing a reservoir of pressurized gas. The second slide valve is advantageously actuated by the fluid means injected into the circuit feeding the cylinder.

According to an advantageous feature, said first and second slide valves are such that when the second slide valve is in its active position, said second circuit being closed and said injection means being in their active position, said first slide valve is mobile between its active and rest positions.

The two slide valves advantageously have combined actions and cooperate with each other to open and close in a concerted manner the circuit feeding the cylinder and the exhaust circuit.

According to an advantageous feature, said second slide valve is mobile in said body in which said first circuit is partly formed.

Accordingly, the two slide valves can be combined in a single body, for example forming a one-piece device that is connected to the circuit feeding the cylinder and to the reservoir in this application instance.

According to an advantageous feature, said first and second slide valves are mobile one in the other, said perforator being mobile in translation in said first and second slide valves.

This feature offers a compact system of mobile slide valves that is relatively simple to manufacture and reliable.

According to an advantageous feature, said first and second fluid circuits include a common fluid part at least in said mobile perforator.

This feature also offers compactness and simplicity of manufacture.

According to an advantageous feature, an annular shape is adopted for said first slide valve arranged around said mobile perforator and said mobile perforator includes a radial fluid passage connected to an axial internal fluid pipe of the mobile perforator, said radial fluid passage being disposed:

in the rest position of the first slide valve, on the same side as the smaller face of the two opposite faces of said wall of said first slide valve, in said active position of the injection means, so that said fluid means move from the end of said fluid orifice leading onto said smaller face toward the end of said fluid orifice leading onto the larger face, and in the active position of said first slide valve, on the same side.

This feature offers a compact delay system, defines the cooperation between the first slide valve and the perforator, and notably ensures a thrust force on the first slide valve throughout its movement.

According to an advantageous feature, said first slide valve includes a free lateral passage for said fluid means, in that it does not constitute a restriction of the flow of said fluid means relative to the whole of said first circuit, said free lateral passage constituting a part of said first circuit feeding said cylinder.

According to an advantageous feature, said common fluid part between said first and second fluid circuits includes said radial fluid passage and said axial internal fluid pipe of the mobile perforator.

According to an advantageous feature, said first and second slide valves adopt their rest positions because of the effect of spring-loading means and adopt their active positions because of the effect of said fluid means.

The invention will be better understood and other features will become apparent on reading the following description of one embodiment of an actuator of the invention, accompanied by the appended drawings, which example is provided by way of nonlimiting illustration.

Figure 1:
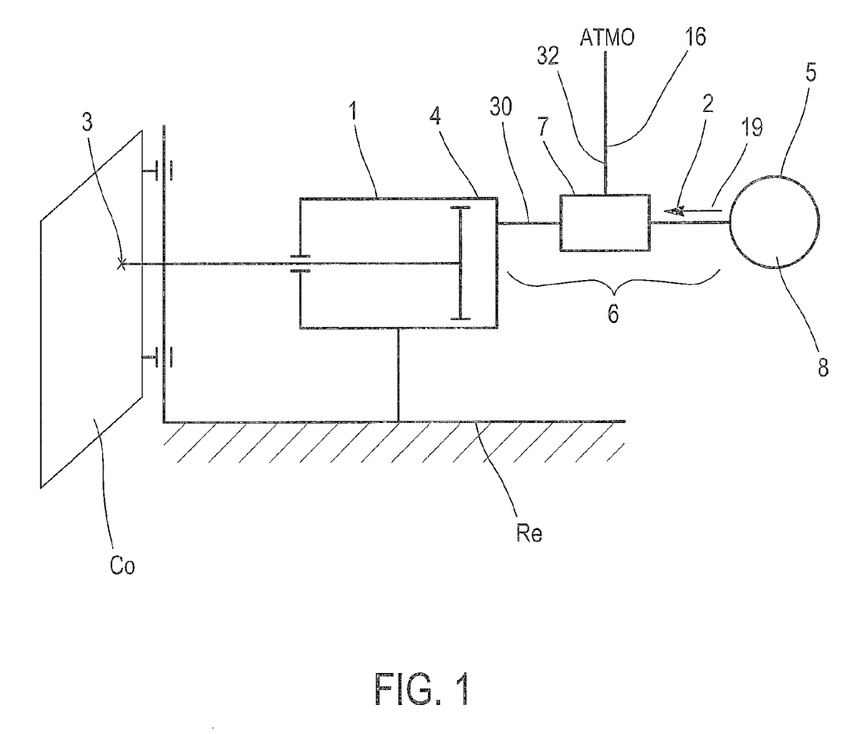
FIG. 1 represents a diagrammatic overview of one embodiment of an aircraft hatch emergency opening actuator of the invention.

FIG. 1 shows an example of an actuator for emergency opening of an aircraft hatch Co, including:

Figure 2A:
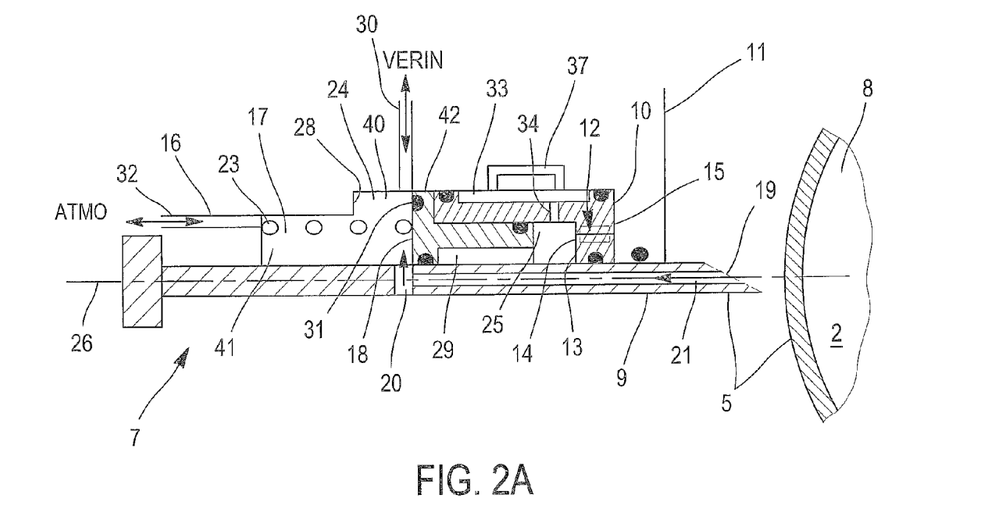
FIGS. 2A to 2E represent the injection delay means diagrammatically, to a larger scale and in more detail during five steps of the operation of the FIG. 1 actuator embodiment.

a cylinder 1 adapted to be connected to the hatch Co at one of its ends 3 and at its other end 4 to a reference frame Re of the aircraft (not represented) to which the hatch is connected, for example the structure of the aircraft or any other intermediate connecting member between the hatch Co and said structure, which connecting member can move during opening or closing of the hatch, fluid means 2, for example a pressurized gas, for feeding the cylinder 1 for emergency opening of the hatch Co, means 5 for injection of the fluid means 2 at a first point 19 of a first fluid circuit 6 feeding the cylinder 1 for emergency opening of the hatch Co, the injection means 5 being able to adopt at least the following two positions:

a first position called the rest position, in which the fluid means 2 are isolated from the cylinder 1, as represented in FIG. 2A, a second position called the active position, in which the fluid means 2 are injected at the first point 19 of the first fluid circuit 6, as represented in FIGS. 2B, 2C, 2D, 2E.

In this example the injection means 5 advantageously comprise:

a reservoir 8 of pressurized gas, containing the fluid means 2, and thus said pressurized gas in this example, including a membrane (not represented) adapted to be perforated to place the injection means 5 in the active position and thus to actuate the cylinder 1 for emergency opening of the hatch Co by release of the gas from the reservoir 8 (FIGS. 2B to 2E), a mobile perforator 9 adapted to perforate the membrane (not represented) of the reservoir 8 thus releasing the pressurized gas to the cylinder 1 via the first fluid circuit 6.

These means 8, 9 are known to a person skilled in the art and would therefore not be described in detail here. The pressurized gas may alternatively be obtained by pyrotechnic means.

When the perforator 9 is at rest, with the emergency opening control (not represented) not actuated, as represented in FIG. 2A, the injection means 5 are in the rest position. When the emergency opening control (not represented) is actuated, the perforator 9 is engaged in the reservoir 8, the membrane (not represented) is perforated, and the pressurized gas reaches the point 19 of the first circuit 6, representing the inlet of the latter in this example, and the injection means 5 are in the active position: this active position of the injection means 5 is represented in FIGS. 2B to 2E.

Thus in a known manner the perforator 9 takes the form of an elongate needle mobile in translation in a body 11 to which the reservoir 8 of pressurized gas is fixed.

In accordance with the invention the actuator represented in FIG. 1 and partially in FIGS. 2A to 2E further includes means 7 for delaying the injection of the fluid means 2 (the pressurized gas) into the cylinder 1, which means comprise, as represented in FIGS. 2A to 2E, a mobile element 10 in the first fluid circuit 6. The mobile element 10 is disposed between the first point 19 and the cylinder 1, delaying opening of the first circuit 6 when the injection means 5 are in the active position, the injection delay being determined by a time of movement of the mobile element 10, as will be explained hereinafter, starting from the moment at which the pressurized gas is released from the reservoir 8 and enters the circuit 6 feeding the cylinder 1.

The cylinder 1 is notably no longer represented in FIGS. 2A to 2E which show the means 7 for delaying injection in more detail and the fluid outlet from the means 7 to the cylinder 1.

Figure 2B:
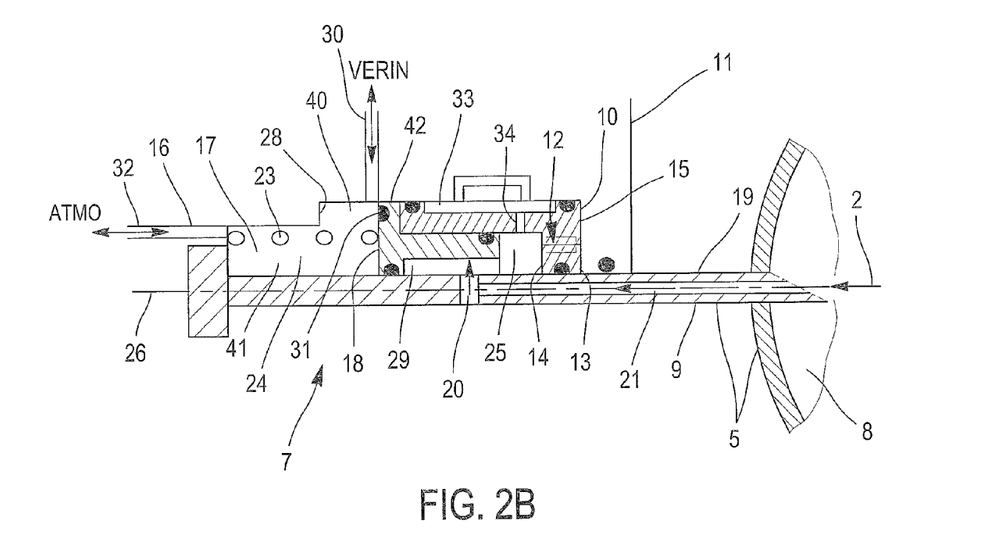
Figure 2C:
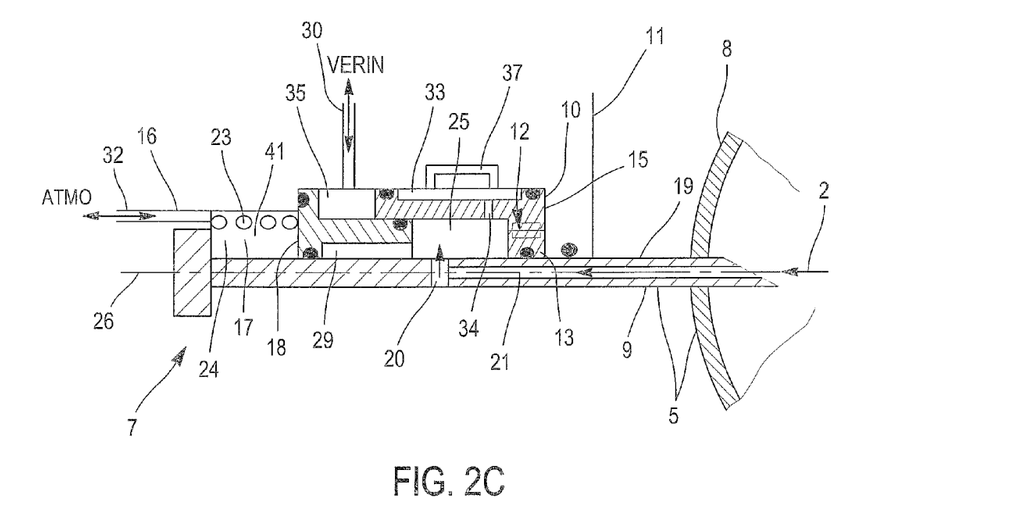
Figure 2D:
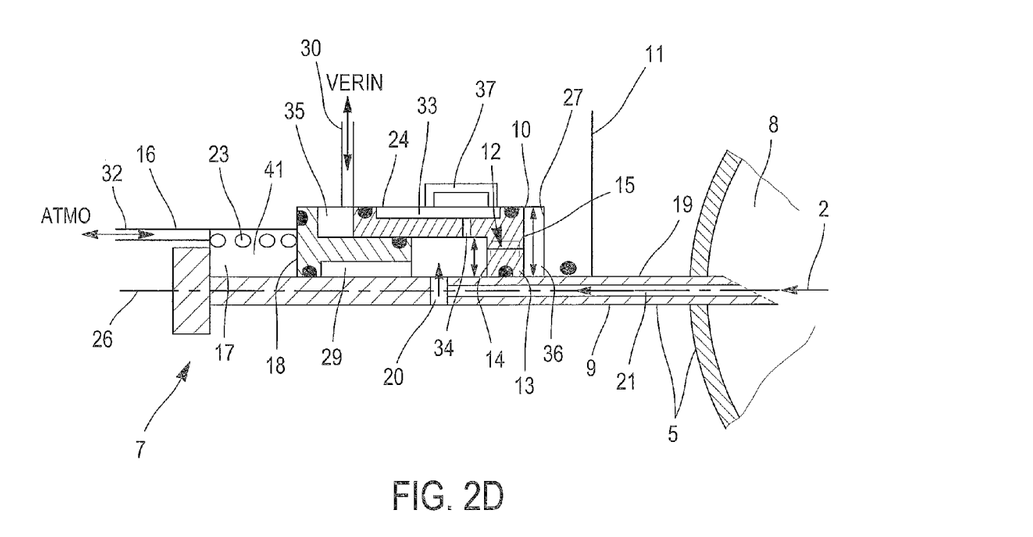
Figure 2E:
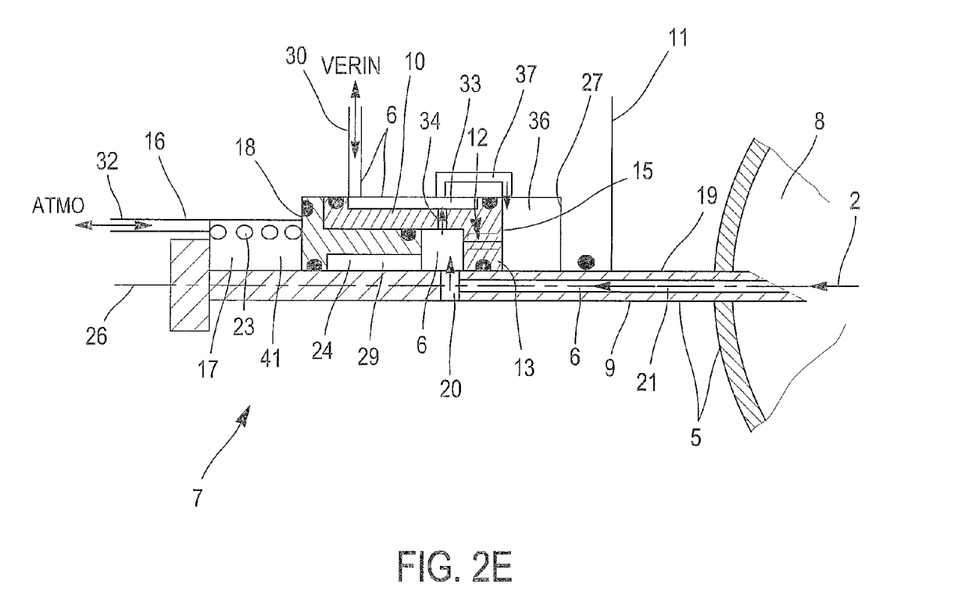

In this example the mobile element is advantageously constituted of a first slide valve 10 actuated by the pressurized gas 2 released from the reservoir 8, the first slide valve 10 being mobile in the body 11 in which the first circuit 6 is partly formed, and in which the perforator 9 advantageously moves, the first slide-valve 10 being mobile at least between the following two positions when the injection means 5 are in the active position:

a first position, called the rest position, in which the first circuit 6 is closed, as represented in FIGS. 2B and 2C, and a second position, called the active position, in which the first circuit 6 is open, as represented in FIG. 2E.

FIG. 2D represents a step with the slide valve 10 in an intermediate position in which it has begun to move away from its rest position toward its active position, without yet having opened the circuit 6 to the cylinder (non represented in FIG. 2).

The injection delaying means 7 advantageously further include a calibrated fluid orifice 12 formed through a wall 13 of the first slide valve 10, the two ends of which connect two opposite faces 14, 15 of the latter with different areas, so as to enable the pressurized gas 2 to create a differential pressure force on either side of the wall 13, which leads to movement of the first slide valve 10 from its rest position (FIGS. 2B and 2C) to its active position (FIG. 2E), notably passing through the FIG. 2D intermediate position.

The flow section of the calibrated fluid through-orifice 12 and/or its length are advantageously defined to form a fluid restriction determining at least in part a delay on commencement of movement of the first slide valve 10 from its rest position, from the moment at which the pressurized gas 2 is released from the reservoir 8, as well as time a time of movement of its first slide valve 10 from its rest position to its active position once its movement commences.

The actuator represented advantageously further includes means 16 enabling the pressurized gas 2 to exhaust from the cylinder 1 via a second fluid circuit 17 that does not feed the cylinder 1 and the inlet of which is shared with the first point 19 of the first circuit 6 when the injection means 5 are in the rest position, as represented in FIG. 2A, and in the event of accidental rupture of the membrane (not represented) occurring without the mobile perforator 9 moving.

The actuator represented in FIG. 2 advantageously further includes a second slide valve 18 actuated by the fluid means 2, this second slide valve 18 being mobile at least between the following two positions:

a first position, called the rest position, in which the second circuit 17 is open when the injection means 5 are in the rest position, as represented in FIG. 2A, and a second position, called the active position, in which the second circuit 17 is closed when the injection means 5 are in the active position, as represented in FIGS. 2C to 2E.

The first slide valve 10 and the second slide valve 18 are advantageously such so that when the second slide valve 18 is in its active position, the second circuit 17 being closed and the injection means 5 being in their active position as represented in FIGS. 2C, 2D, 2E, the first slide valve 10 is mobile between its active and rest positions, as represented in FIGS. 2C to 2E.

The second slide valve 18 is advantageously mobile in the body 11 in which the first circuit 6 is partly formed, and the first slide valve 10 and the second slide valve 18 are advantageously mobile one in the other, the perforator 9 for its part being mobile in translation in the first slide valve 10 and the second slide valve 18, as will be described in detail hereinafter.

The body 11 is a rigid body for which any exterior shape may be adopted, according to requirements. It includes an internal chamber 24 in which the first slide valve 10 and the second valve 18 move. The chamber 24 is preferably cylindrical with a circular section. The perforator 9 is disposed to slide along the longitudinal axis 26 of the internal chamber 24 and the slide valves 10 and 18 are preferably rigid cylindrical elements with a circular section that move longitudinally between their respective extreme positions along the longitudinal axis 26 of the chamber 24. The cylindrical slide valves 10 and 18 therefore have a central axial bore through them for this purpose and extend around the perforator 9.

As shown in FIG. 2, the first slide valve 10 advantageously has a cylindrical internal recess 25 extending axially that substantially limits the shape of the first slide valve 10 to a tube one end of which is closed by the wall 13 and the opposite end of which is open. The smaller area face 14 of the two opposite faces of the wall 13 is constituted of the interior face of the wall 13 facing the internal recess 25 and the larger area face 15 is constituted of the opposite exterior face of the end wall 13 of the slide valve 10 forming the bottom thereof. In this example the faces 14 and 15 have plane annular surfaces perpendicular to the longitudinal axis 26 and the inside diameter of which corresponds to the outside diameter of the perforator 9 and the outside diameters of which respectively correspond to the inside diameter of the recess 25 and the inside diameter of the chamber 24. The differential thrust on the first slide valve 10 is established by the difference between the outside diameters of the surfaces substantially corresponding to the thickness of the cylindrical wall of the tube forming the first slide valve 10.

The second slide valve 18 advantageously has a shape substantially similar to that of the first slide valve 10 and its open end is introduced into the internal recess 25 of the latter so that they slide one in the other around the perforator 9 and on the interior cylindrical walls of the chamber 24, forming a chamber 29 of variable volume according to the relative positions of the two slide valves 10, 18, as represented in FIGS. 2B to 2E.

The cylindrical internal chamber 24 is limited axially by two walls 27, 28 perpendicular to the longitudinal axis 26, disposed face-to-face, against which the two slide valves 10, 18 bear through their respective bottoms, in its active position in the case of the second slide valve 18, as represented in FIGS. 2C to 2E, and in its rest position in the case of the first slide valve 10, via the bearing face 15, as represented in FIGS. 2A and 2B.

An annular shape is therefore advantageously adopted for the first slide valve 10 thus arranged around the mobile perforator 9. The mobile perforator 9 includes:

a radial fluid passage 20 that leads onto the cylindrical exterior surface of the perforator 9 in the variable volume chamber 29 when the injection means 5 are activated, and an axial internal fluid pipe 21 that leads at one end of the perforator 9 into the reservoir 8 of pressurized gas 2 when the injection means 5 are activated and at the other end into the radial fluid passage 20.

The radial fluid passage 20 is thus in fluid communication with the internal fluid pipe 21 and leads into the chamber 29 with the result that:

in the rest position of the first slide valve 10, the radial fluid passage 20 on the side the side of the smaller face 14 of the two opposite faces 14, 15 of the wall 13 of the first slide valve 10, in the active position of the injection means 5, so that the fluid means 2 injected into the chamber 29 move from the end of the fluid orifice 12 that leads onto the smaller face 14 toward the end of the fluid orifice 12 leading onto the larger face 15, as represented in FIG. 2B, and in the active position of the first slide valve 10, the radial fluid passage 20 remains on the same side as defined hereinabove, as represented in FIG. 2E.

In the rest position of the two slide valves 10, 18, as represented in FIG. 2A, the second slide valve 18 bears on the open axial end of the first slide valve 10, for example via an external flange 42 radially extending the bottom of the second slide valve 18, and the chamber 29 has its smallest volume. The radial passage 20 of the perforator 9 when it is placed in the rest position (FIG. 2A) then leads into the chamber 24 outside the variable volume chamber 29, to be more precise between the exterior face 31 of the second slide valve 18 and the facing face 28 of the internal chamber 24. The body 11 includes an outlet 30 for the pressurized gas 2 to the cylinder 1, as represented in FIG. 2; this outlet 30 leads into the internal chamber 24 in the part 40 thereof formed when the two slide valves 10, 18 are in the rest position (FIG. 2A), into which leads the radial passage 20 of the perforator 9 when also in its rest position (FIG. 2A). A pipe 32 venting to atmospheric pressure advantageously leads onto the bottom wall 28 of the internal chamber 24, on which the second slide valve 18 bears in its active position.

The first slide valve 10 and the second slide valve 18 adopt their rest positions (FIG. 2A) as a result of the effect of spring-loading means 23 and adopt their active positions (FIGS. 2C to 2E for the second slide valve 18 and FIG. 2E for the first slide valve 10) because of the effect of the pressurized gas released from the reservoir 8. The spring-loading means 23 may be a coil spring, as represented here, which bears on the bottom of the second slide valve 18 and on the end wall 28 of the chamber 24 or in a housing 41 formed for this purpose in the latter, as represented here.

When the two slide valves 10, 18 are in the rest position (FIG. 2A), the outlet 30 to the cylinder is in fluid communication with the outlet 32 at atmospheric pressure, via the part 40 of the internal chamber 24 situated to the rear of the second slide valve 18, which is isolated from the chamber 29, the part 40 of the chamber 24 into which also leads the radial passage 20 of the perforator 9 in its rest position. This configuration enables closing of the hatch Co by enabling gas to escape from the cylinder to the atmosphere and conjointly enables escape of any pressurized gas 2 that might be released accidentally from the reservoir 8.

When the emergency opening system is actuated, the perforator 9 is driven into the reservoir 8 so that the radial passage 20 of the perforator 9 leads into the variable volume annular chamber 29, as represented in FIG. 2B. When this happens, the radial passage 20 passing the end wall of the second slide valve 18, the exhaust circuit 16 is closed, the pressurized gas 2 leaving the reservoir 8 that has just been opened by piercing the membrane (not represented) being sent into the chamber 29.

The second slide valve 18 is then moved because of the effect of the pressurized gas 2 from its rest position to its active position (FIG. 2C), compressing the spring 23. When this happens, the bottom wall of the second slide valve 18 passes the outlet 30 to the cylinder leading onto the internal wall of the chamber 24, the second slide valve 18 then closing the fluid connection between the outlet 30 (cylinder) and the outlet 32 (atmosphere) of the chamber 24, thereby isolating the circuit 6 feeding the cylinder from the vent to the atmosphere, which circuit will use the outlet 30 to inject gas into the cylinder 1. In this active position of the second slide valve 18, the first slide valve 10 being still in the rest position, as represented in FIG. 2C, the volume of the variable volume chamber 29 is then at its maximum. Still in this position, the outlet 30 to the cylinder 1 is fluidically isolated from the variable volume chamber 29 and leads into a temporary closed annular chamber 35 formed between the first slide valve 10 and the second slide valve 18, on the one hand, and the part of the interior surface of the chamber 24 onto which the outlet 30 leads, on the other hand, as represented in FIG. 2C. Thus at this stage the outlet 30 feeding the cylinder 1 is not yet in fluid communication with the pressurized gas coming the from the reservoir 8.

From FIG. 2C, and from this configuration, the volume of the variable volume chamber no longer being able to increase, the pressurized gas 2 injected into this chamber 29 escapes from it through the calibrated fluid orifice 12 in the wall 13 of the first slide valve 10, to penetrate behind the latter into a part 36 of the chamber 24 included between the exterior bottom of the first slide valve 10 and the end wall 27 of the chamber 24, as represented in FIG. 2D. This flow of the gas 2 leads to movement of the first slide valve 10 from its rest position to its active position until the open end of the first slide valve 10 abuts against the flange 42 of the second slide valve 18, as represented in FIG. 2E. In this position, the variable volume chamber 29 and the radial passage 20 of the perforator will be arranged in such a way that the radial passage 20 still leads into the chamber 29, as shown in FIG. 2E, throughout the movement of the first slide valve 10 from its rest position to its active position, in order to ensure the full movement of the slide valve 10 and to enable the cylinder 1 to be fed via the radial passage 20 of the perforator and the variable volume chamber 29. During its movement, the volume of the temporary closed annular chamber 35 is reduced and the first slide valve 10 establishes fluid communication between the variable volume chamber 29 and the outlet 30 to the cylinder 1, as explained hereinafter.

The first slide valve 10 is advantageously provided with an external annular recess that is formed on its cylindrical external surface and that defines an annular external chamber 33 cooperating with the cylindrical interior wall of the chamber 24 in the body 11 when the first slide valve 10 moves in translation in the chamber 24. As represented in FIG. 2, this external annular chamber 33 is in permanent fluid communication, thanks to a (radial) lateral passage 34 formed in the tubular cylindrical wall of the first slide valve 10, with the internal recess 25 of the first slide valve 10, which forms the variable volume chamber 29 when combined with the internal recess of the second slide valve 18. The annular external chamber 33 therefore moves with the first slide valve 10. This annular external chamber 33 is closed in the rest position of the first slide valve 10 (FIGS. 2A to 2C) and establishes fluid communication for the flow of the pressurized gas 2 between the radial passage 20 of the perforator 9 and the outlet 30 to the cylinder 1 in the active position of the first slide valve 10, via the passage 34 in the latter.

Moreover, still in the active position of the first slide valve 10, the annular chamber 33 advantageously establishes fluid communication between the radial passage 20 of the perforator 9 and the part 36 of the chamber 24 that is formed between the wall 27 of the latter and the back of the first slide valve 10 when it moves toward its active position. This fluid communication is preferably established via the variable volume chamber 29 and via a bridging type fluid pipe 37 formed in the body 11 that at a given moment connects the annular chamber 33 to this part 36 of the chamber 24. The fluid pipe 37 is therefore arranged in such a way that this fluid connection is established only when the first slide valve 10 reaches its active position. In other positions of the first slide valve 10, as represented in FIGS. 2A to 2D, the two outlets of this pipe 37 lead into the annular chamber 33, the pipe 37 no longer having to establish fluid communication as defined above, in order for the calibrated orifice 12 not to be bypassed and for the delay therefore to be controlled.

The function of the fluid connection pipe 37 is advantageously to ensure that the first slide valve 10 is held in its active position when the first slide valve 10 is in its active position and the cylinder 1 is then fed from the reservoir 8 at the maximum pressure, so as not to interfere with the feeding of the cylinder by any unintended movements, this slide valve 10 no longer being subjected to the effect of the spring 23 when the second slide valve 18 is in its active position, i.e. when the cylinder 1 is fed via the annular variable volume chamber 29.

When the gas 2 is no longer feeding the cylinder 1, the pressure falls in the circuit 6 and the return spring 23 ensures simultaneous return of the two slide valves 10, 18 to their rest position against the wall 27 of the chamber 24.

The circuit 6 for feeding the cylinder 1 is formed, in the upstream to downstream direction, starting from the reservoir 8, by the following components: the axial pipe 21 of the perforator 9, the radial passage 20 of the perforator 9, the variable volume chamber 29, the passage 34 in the first slide valve 10, the external annular chamber 33, the fluid outlet 30 to the cylinder 1. None of these comments represents a specific or singular restriction of the flow of the pressurized gas 2, and may be dimensioned so that the release of the pressure in the reservoir 8 is not impeded in its path to the cylinder 1 as soon as the circuit 6 is opened by the first slide valve 10.

It is found that the first fluid circuit 6 and the second fluid circuit 17 have a common fluid part at least in the mobile perforator 9, constituted in this example by the axial internal fluid pipe 21 and the radial fluid passage 20 of the perforator 9.

The first slide valve 10 and the second slide valve 18 will be provided with any appropriate seal, for example O-ring seals, in order to render the variable volume chamber 29 gas-tight with respect to the gas 2, the annular chamber 33, the part 36 of the chamber 24, as represented, and at a general level the circuit 6 for feeding the cylinder 1.

The invention claimed is:

1. Aircraft hatch emergency opening actuator, comprising:
a cylinder arranged to be connected to said hatch at one of its ends and at its other end to a reference frame of the aircraft to which said hatch is connected,
fluid means for feeding said cylinder for emergency opening of the hatch,
means for injection of said fluid means at a first point of a first fluid circuit feeding said cylinder for emergency opening of the hatch, said injection means being able to adopt two positions:
a first position, called the rest position, in which said fluid means are isolated from said cylinder,
a second position, called the active position, in which said fluid means are injected at said first point of said first fluid circuit,
means for delaying the injection of said fluid means into said cylinder, which delay means include a mobile element in said first fluid circuit, disposed between said first point and said cylinder, delaying opening of said first circuit when said injection means are in the active position, the injection delay being determined by a time of movement of said mobile element.

2. Actuator according to claim 1, wherein said fluid means is a pressurized gas, and
wherein said injection means include:
a reservoir of pressurized gas, said gas reservoir including a membrane adapted to be perforated to place said injection means in the active position and thus to actuate said cylinder for emergency opening of the hatch by release of the gas from said reservoir,
a mobile perforator arranged to perforate same membrane of said reservoir, thus releasing the pressurized gas to said cylinder via the first fluid circuit.

3. Actuator according to claim 2, wherein said mobile element is constituted of a first slide valve actuated by said fluid means, said first slide valve being mobile in a body in which said first circuit is partly formed, at least between the following two positions, said injection means being in the active position:
a first position, called the rest position, in which said first circuit is closed, and
a second position, called the active position, in which said first circuit is open.

4. Actuator according to claim 2,
wherein said mobile element is constituted of a first slide valve actuated by said fluid means, said first slide valve being mobile in a body in which said first circuit is partly formed, at least between the following two positions, said injection means being in the active position:
a first position, called the rest position, in which said first circuit is closed, and
a second position, called the active position, in which said first circuit is open, and
wherein an annular shape is adopted for said first slide valve arranged around said mobile perforator and in that said mobile perforator includes a radial fluid passage connected to an axial internal fluid pipe of the mobile perforator, said radial fluid passage being disposed:
in the rest position of the first slide valve and in the active position of said first slide valve, on the same side as the smaller face of the two opposite faces of said wall of said first slide valve, in said active position of the injection means, so that said fluid means move from the end of said fluid orifice leading onto said smaller face toward the end of said fluid orifice leading onto the larger face.

5. Actuator according to claim 4, wherein said first slide valve includes a free lateral passage for said fluid means, in that it does not constitute a restriction of the flow of said fluid means relative to the whole of said first circuit, said free lateral passage constituting a part of said first circuit feeding said cylinder.

6. Actuator according to claim 5, wherein said common fluid part includes said radial fluid passage and said axial internal fluid pipe of the mobile perforator.

7. Actuator according to claim 1, wherein said mobile element is constituted of a first slide valve actuated by said fluid means, said first slide valve being mobile in a body in which said first circuit is partly formed, at least between the following two positions, said injection means being in the active position:
a first position, called the rest position, in which said first circuit is closed, and
a second position, called the active position, in which said first circuit is open, and
wherein the first circuit opens after a predetermined stroke of said first slide valve.

8. Actuator according to claim 7, wherein said means for delaying injection further include a calibrated fluid orifice formed through a wall of said first slide valve, two ends whereof connect two opposite faces of said first slide valve with different areas so as to enable said fluid means to create a differential pressure force on either side of wall, which leads to said first slide valve moving from its rest position to its active position.

9. Actuator according to claim 8,
wherein said injection means includes:
a reservoir of pressurized gas, said gas reservoir including a membrane adapted to be perforated to place said injection means in the active position and thus to actuate said cylinder for emergency opening of the hatch by release of the gas from said reservoir,
a mobile perforator arranged to perforate said membrane of said reservoir, thus releasing the pressurized gas to said cylinder via the first fluid circuit,
said actuator further comprising:
means for exhausting said fluid means from said cylinder via a second fluid circuit that does not feed said cylinder and the inlet of which is common to said first point of said first circuit when said injection means are in the rest position and in the event of accidental rupture of said membrane occurring other than on movement of said mobile perforator.

10. Actuator according to claim 8, wherein the flow section of said calibrated fluid through-orifice and/or its length are defined so as to form a fluid restriction determining at least in part a delay on the commencement of movement of said first slide valve from its rest position, as well a movement time of said first slide valve from its rest position to its active position.

11. Actuator according to claim 10,
wherein said injection means includes:
a reservoir of pressurized gas, said gas reservoir including a membrane adapted to be perforated to place said injection means in the active position and thus to actuate said cylinder for emergency opening of the hatch by release of the gas from said reservoir,
a mobile perforator arranged to perforate said membrane of said reservoir, thus releasing the pressurized gas to said cylinder via the first fluid circuit,
said actuator further comprising:
means for exhausting said fluid means from said cylinder via a second fluid circuit that does not feed said cylinder and the inlet of which is common to said first point of said first circuit when said injection means are in the rest position and in the event of accidental rupture of said membrane occurring other than on movement of said mobile perforator.

12. Actuator according to claim 10,
wherein said injection means includes:
a reservoir of pressurized gas, said gas reservoir including a membrane adapted to be perforated to place said injection means in the active position and thus to actuate said cylinder for emergency opening of the hatch by release of the gas from said reservoir,
a mobile perforator arranged to perforate said membrane of said reservoir, thus releasing the pressurized gas to said cylinder via the first fluid circuit,
said actuator further comprising:
wherein an annular shape is adopted for said first slide valve arranged around said mobile perforator and in that said mobile perforator includes a radial fluid passage connected to an axial internal fluid pipe of the mobile perforator, said radial fluid passage being disposed:
in the rest position of the first slide valve, on the same side as the smaller face of the two opposite faces of said wall of said first slide valve, in said active position of the injection means, so that said fluid means move from the end of said fluid orifice leading onto said smaller face toward the end of said fluid orifice leading onto the larger face, and in the active position of said first slide valve, on the same side.

13. Actuator according to claim 7, wherein said injection means include:

a reservoir of pressurized gas, said gas reservoir including a membrane adapted to be perforated to place said injection means in the active position and thus to actuate said cylinder for emergency opening of the hatch by release of the gas from said reservoir, a mobile perforator arranged to perforate said membrane of said reservoir, thus releasing the pressurized gas to said cylinder via the first fluid circuit, said actuator further comprising:

means for exhausting said fluid means from said cylinder via a second fluid circuit that does not feed said cylinder and the inlet of which is common to said first point of said first circuit when said injection means are in the rest position and in the event of accidental rupture of said membrane occurring other than on movement of said mobile perforator.

14. Actuator according to claim 13, further comprising:

a second slide valve actuated by said fluid means, said second slide valve being mobile at least between the following two positions:

a first position, called the rest position, in which said second circuit is open when said injection means are in the rest position, and a second position, called the active position, in which said second circuit is closed when said injection means are in the active position.

15. Actuator according to claim 14, wherein said first slide valve and said second slide valve adopt their rest positions because of the effect of spring-loading means and adopt their active positions because of the effect of said fluid means.

16. Actuator according to claim 14, wherein said first slide valve and said second slide valve are such that when the second slide valve is in its active position, said second circuit being closed and said injection means being in their active position, said first slide valve is mobile between its active and rest positions.

17. Actuator according to claim 16, wherein said second slide valve is mobile in said body in which said first circuit is partly formed.

18. Actuator according to claim 14, wherein said second slide valve is mobile in said body in which said first circuit is partly formed.

19. Actuator according to claim 18, wherein said first slide valve and said second slide valve are mobile one in the other, said mobile perforator being mobile in translation in said first slide valve and said second slide valve.

20. Actuator according to claim 19, wherein said first fluid circuit and said second fluid circuit include a common fluid part at least in said mobile perforator.

* * * * *